May 6, 1969

J. F. McGRAIL 3,442,199

BEVERAGE MAKER

Filed Nov. 29, 1967

INVENTOR.
JOHN F. McGRAIL
By Huebner & Worrel
ATTORNEYS.

May 6, 1969

J. F. McGRAIL 3,442,199

BEVERAGE MAKER

Filed Nov. 29, 1967

INVENTOR.
JOHN F. McGRAIL
BY Huebner & Worrel
ATTORNEYS.

United States Patent Office 3,442,199
Patented May 6, 1969

3,442,199
BEVERAGE MAKER
John F. McGrail, 13661 Olympic Ave.,
Costa Mesa, Calif. 92626
Filed Nov. 29, 1967, Ser. No. 686,489
Int. Cl. A47t 31/10, 31/06
U.S. Cl. 99—283
12 Claims

ABSTRACT OF THE DISCLOSURE

A beverage maker, such as is used to make coffee by the drip method, in which an upper water compartment and a lower beverage compartment are provided in a single cylindrical container. Thermostatically controlled heating elements are provided in the two compartments. A unitary valve and coffee basket assembly is removably positioned in the container so as to separate the two compartments. Improved bimetallic actuated valves are disclosed for controlling flow of water from the upper compartment to the lower compartment.

Background of the invention

This invention relates generally to a beverage maker and, more particularly, to a beverage maker of the type employed for brewing coffee in accordance with the so-called drip method.

It is generally recognized that the drip method of brewing coffee is one of the most satisfactory as well as popular methods. In such method, briefly, hot water, which has just previously been brought to a temperature of about 195° F., is caused to slowly seep through a bed of ground coffee and then pass into a beverage receptacle from which it is later dispensed as a beverage.

In the conventional drip-type coffee maker, an upper compartment is employed for receiving hot water or for heating water therein, and a separate lower beverage compartment is provided which retains the water after it has seeped through ground coffee in a basket separating the two compartments. In one form of such a coffee maker, there are three separate components, namely, upper and lower glass containers and an intermediate heating and coffee basket assembly which is removably mounted on the lower container and supports the upper container. This form of coffee maker has the disadvantage that it is somewhat fragile due to the glass construction of the upper and lower containers. Also, because the coffee maker is formed of three separate parts, it is inconvenient to store, and there is always the possibility that one of the parts might be misplaced by the user.

In another form of drip type coffee maker, the upper and lower containers are hingedly connected together, which connection adds to the cost of the coffee maker, and provides a unit which is somewhat clumsy to handle.

Coffee makers of the character described have often employed temperature responsive valves for controlling the flow of water from the upper compartment through the ground coffee into the lower beverage compartment. However, such valves have been rather complex in structure and expensive to manufacture.

Summary of the invention

It is therefore the principal object of the present invention to provide a drip-type beverage maker in which the upper and lower compartments thereof are provided in a single container, thus overcoming the above mentioned disadvantages of the conventional drip-type coffee makers.

Another object of the invention is to provide an improved temperature responsive valve for controlling the flow of water from the upper compartment of a beverage maker to the lower compartment thereof.

According to a principal aspect of the present invention, there is provided a drip beverage maker in which the upper and lower compartments are provided in a single container. A heating element is positioned in the upper compartment. A unitary valve and coffee basket assembly is removably positioned in the container and serves to separate the upper compartment from the lower compartment thereof. The valve of such assembly extends into the upper compartment and carries a temperature responsive element. The coffee basket of the assembly extends downwardly into the lower compartment. When the temperature within the upper compartment reaches a predetermined value, preferably about 195° F., the temperature responsive element causes the valve to open, thereby permitting hot water in the upper compartment to flow through the ground coffee in the basket into the lower compartment.

Preferably, the container of the beverage maker is formed of sheet metal. As a consequence, by the present invention, a beverage maker is provided having a single rugged housing, in which the valve and the coffee basket assembly may be easily positioned when it is desired either to make coffee or to store the coffee maker unit, or from which the assembly may be easily withdrawn when it is desired to clean the assembly or the interior of the housing.

In the preferred form of the invention, a second heating element is associated with the lower compartment of the beverage maker container, and a temperature sensitive switching device is provided for inactivating the heating element in the upper compartment and activating the heating element associated with the lower compartment after the hot water from the upper compartment seeps through the coffee grounds in the basket assembly and enters the lower compartment.

According to another aspect of the invention, a bimetallic element is employed for actuating the valve which controls the flow between the upper and lower compartments of the beverage maker. In one embodiment, the bimetallic element is connected by a spring to the valve element which closes the port providing communication between the upper and lower compartments. The spring serves to assist the bimetallic element in unseating the valve member when the temperature of the water in the upper compartment reaches a predetermined value. In another embodiment of the invention, the bimetallic element serves to shift a cam member into such a position that a floatable valve element will be allowed to unseat from the valve seat when the temperature of the water in the upper compartment reaches a predetermined value.

Other objects, aspects and advantages of the invention will become apparent from the following description taken in connection with the accompanying drawings.

*Description of the preferred embodiments*

Figure 1:
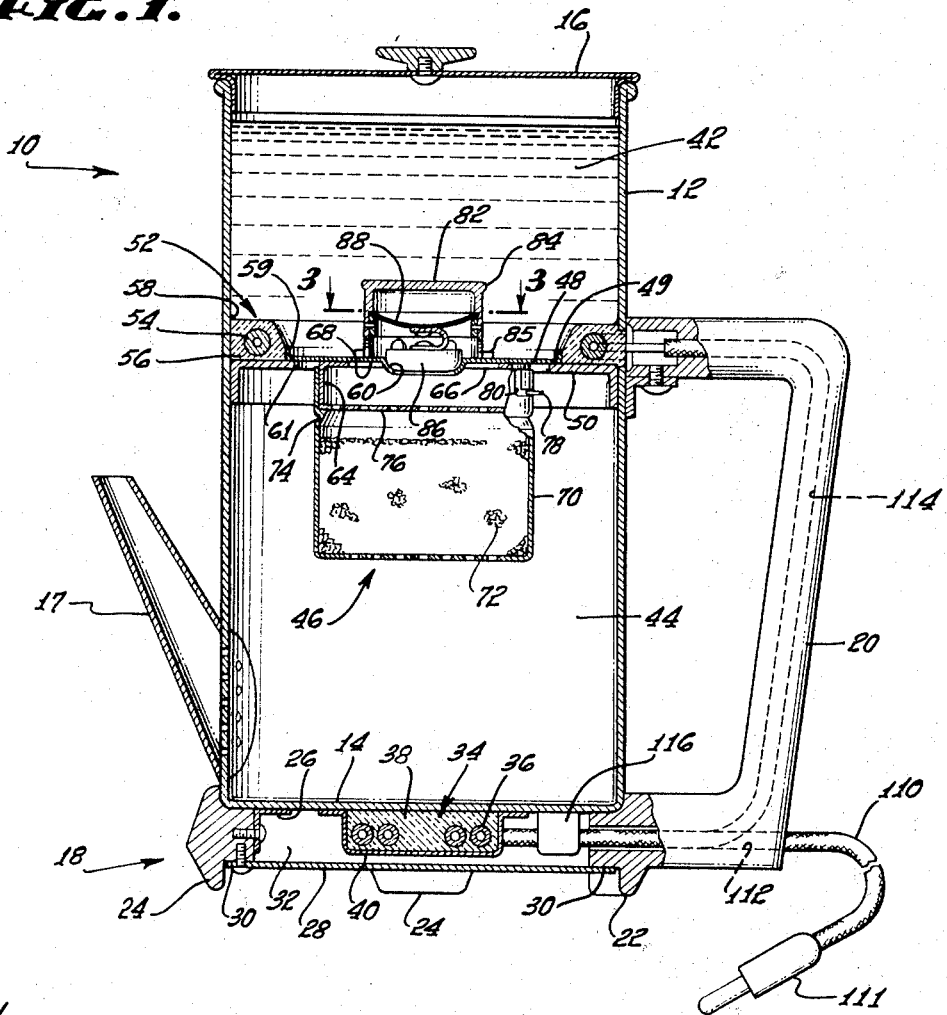
FIGURE 1 is a vertical section taken through the center of a beverage maker in accordance with the present invention which embodies one form of a valve assembly, the valve element of the assembly being shown in its closed position, and with the handle of the beverage maker being shown partially in section.

Referring now to the drawings in detail, there is illustrated in FIGURE 1 the beverage maker 10. The beverage maker comprises a generally vertical cylindrical container 12, which is closed at its lower end by a bottom wall 14, and its upper end by a lid 16. The container is preferably formed of aluminum or other sheet metal. A spout 17 is provided at the lower portion of the container. The container 12 is supported by a base, generally designated 18. A handle 20 is suitably affixed to the container 12 and shaped at its lower end to provide a leg 22. Additional legs 24 are connected to the bottom portion of the container 12 by means of brackets 26, only one being shown. The legs 22 and 24 serve to support the container 12 in its upright position and to space the container from its supporting surface (not shown). A circular plate 28 is connected to downwardly facing shoulders 30 on the feet 22 and 24. The space between this plate and the bottom 14 of the container provides a chamber 32, in which a heating element 34 is positioned. The heating element 34 is in the form of a coiled wire 36 embedded in ceramic 38, which is enclosed within a metal container 40, the latter being suitably secured in the bottom of the container.

The container 12 is divided into an upper water compartment 42 and a lower beverage compartment 44, by means of a unitary valve and coffee basket assembly, generally designated 46.

The assembly 46 includes a circular plate 48, which is supported in the container 42 by an upwardly facing surface 49 provided by an annular flange 50. The flange is affixed to the cylindrical wall of the container 12 and extends radially inwardly therefrom. The surface 49 also supports an annular upper heating element 52, which is composed of a ring-shaped coiled resistance wire 54 embedded in an annular ceramic body 56. The body 56 is fixed to the wall 12 of the container by brazing, such as indicated at 58.

The page 48 has an upwardly turned outer rim 59 which engages the inner cylindrical surface 61 of the upper heating element 52 in frictional and sealing relationship therewith.

The plate 48 is shaped to provide a circular, dished valve seat 60 which terminates in a central port 62. A ring 64 coaxial with the port 62 depends downwardly from the plate 48. The ring includes an upper inwardly extending annular flange 66 which is secured to the bottom 68 of the plate 48 by welding, brazing, or the like. A perforated container 70 which contains infusion material 72, such as ground coffee, is slidably fitted upon the ring 64. The basket 70 is formed with an inwardly extending flange 74 which supports a perforated diffusion plate 76. This plate serves to prevent coffee grounds, when moistened, from expanding into the upper compartment 42 through the port 62. Two bayonet locking elements 78 (only one being seen in FIGURE 1) are affixed to diametrically opposed sides of the ring 64 and pass through right angle slots 80 formed on opposed sides of the basket 70.

The assembly 46 includes a cylindrical valve housing 82 which extends upwardly into the upper compartment 42. The housing embodies circumferentially spaced flanges 83 at its lower end. Rivets 83a passing through these flanges and plate 48 affix the housing to the plate. A flange 84 extends radially outwardly from the upper end of the housing to provide a finger engaging portion so that the user of the beverage maker 10 may easily grip the assembly 46 and withdraw it from the container 12. By the provision of the bayonet locking elements 78, the basket 70 may be easily removed from the ring 64 after the assembly 46 is removed from the container so that ground coffee may be placed in the basket or used grounds removed therefrom.

A plurality of passages 85 are provided in the lower portion of the valve housing 82 between the flanges 83 to provide flow communication between the upper compartment 42 and lower compartment 44 through the port 62 in the plate 48.

Figure 2:
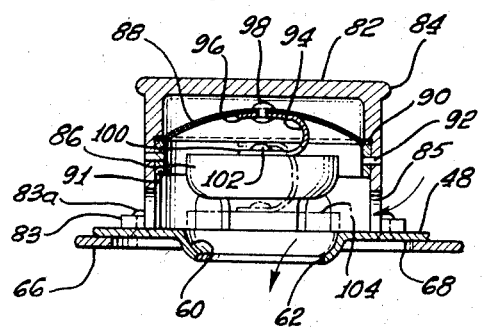
FIGURE 2 is an enlarged partial sectional view of the valve assembly illustrated in FIGURE 1, showing the valve element in an intermediate position in phantom lines and in an open position in full lines.
Figure 3:
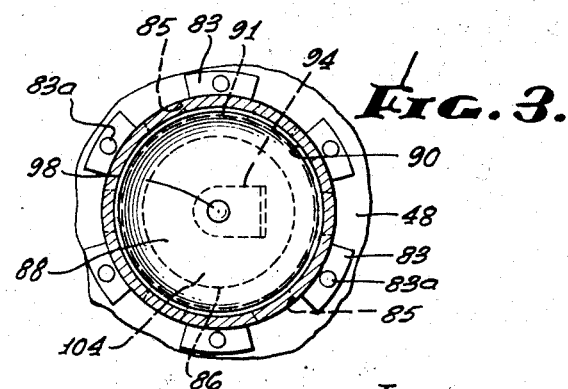
FIGURE 3 is an enlarged horizontal section taken along line 3—3 of FIGURE 1.

A valve element 86 complementary to the dished valve seat 60 is normally seated thereon to close the port 62. The valve element 86, as best seen in FIGURES 2 and 3, is controlled by a temperature responsive element, preferably in the form of a bimetallic, circular disk 88. The disk is mounted in a recess 90 in the housing 82 by means of a ring 91 which is fixedly mounted in the recess by removable pins 92. A spring element 94, preferably formed from a thin metal rod bent into the shape of a U, connects the bimetallic element 88 to the valve element 86, one of the legs 96 of the U-shaped spring being secured to the element 98 by a rivet or screw 102 to the valve element 86.

The bimetallic element 88 is designed so as to be normally positioned as illustrated in FIGURE 1, wherein the spring element 94 is relaxed and the valve element 86 is seated on the valve seat 60. As the temperature of the water in the upper compartment 42 rises, the bimetallic element 88 flexes upwardly with a snap action to the position as shown in FIGURE 2. For a brief moment of time, the valve element 86 remains seated upon the valve seat due to the pressure exerted on the upper surface 104 of the valve element by the water in the compartment 42 and the spring element 94 is tensioned (as shown in phantom lines in FIGURE 2) allowing the element 88 a relatively unimpeded start in its upward movement to overcome inertia. When the bimetallic element 88 has, by snap action, reached its upper position, FIGURE 2, the inertia of element 88 and spring 94 will dislodge the valve element 86 upward from the valve seat 60, as also shown in FIGURE 2.

The spring 94 in the valve assembly illustrated in FIGURES 1 to 3 performs a useful and desired function. It will allow the bimetallic element 88 to commence its snap action upward movement without momentarily being impeded by the force drag of the valve element 86. While the valve element 86 can be connected directly to the bimetallic element 88 with no intervening spring, it has been found that the efficiency of such valve arrangement would be curtailed.

The coil 54 of the upper heating element 52 and the coil 36 in the lower heating element 34 are supplied with electrical power by means of a cord 110 which terminates in a plug 111. The cord extends through passages 112 and 114 in the handle 20 for connection to a thermostatic switch 116 and a magnetic latching type switch 117 attached to the bottom 14 of the container 12 and for connection to the heating coils. The switch 116 controls the electrical power delivered to the upper and lower heating element, and the magnetic latching type switch 117 controls the power delivered to the switch 116 and lower heating element 34.

Figure 8:
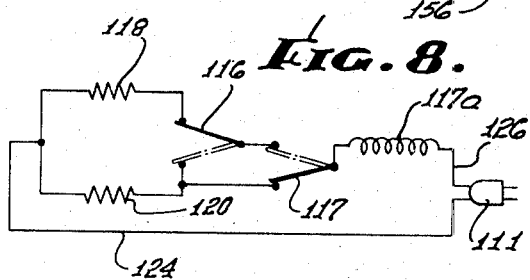
FIGURE 8 is a wiring diagram, in its simplest form, of the electrical circuit employed in the coffee maker of the present invention.

Reference is made to FIGURE 8 which shows a simplified wiring diagram for the beverage maker. The circuit includes a resistor 118, which represents the upper heating coil 54, and a resistor 120, which represents the lower heating coil 36. The plug 111 is included in the circuit for connection to a conventional household electrical outlet. A conductor 124 connects one prong of the plug to both of the resistors 118 and 120, while a second conductor 126 connects the other prong of the plug to the magnetic latching type switch 177, provided with a magnetic coil 117a. The switch 117 is normally in the closed position shown in full lines in FIGURE 8, wherein the resistor 120, and therefore, the lower heating element 34, is activated. When it is desired to start brewing coffee, that is energizing resistor 118 of upper heating element 52, the switch 117 is manually moved by a knob (not shown) on the outside of the container 12 to a "brew" position, illustrated by the phantom lines in FIGURE 8. With the switch 117 moved to the "brew position" and energy flows through conductor 126 to the magnetic coil 117a and the switch will be held or latched in position.

The thermostatic switch 116 is normally in the position shown in full lines in FIGURE 8, wherein the resistor 120, and therefore, the upper heating element 52, is activated by current passing through switch 117 and 116. When the switch 116 senses a predetermined elevated temperature, it shifts to the position shown in phantom lines in FIGURE 8, wherein the resistor 120 and therefore, the lower heating element 34 is activated, and the upper heating element is simultaneously deactivated.

At the time the circuit is deactivated, the magnetic coil 117a will release the switch 117 from the "brew" position and by any suitable spring means, the switch will return to the normally closed position, whereby only the lower resistor 120 of lower heating element 34 can be activated. Such switching arrangement of switch 117 serves two important features in that it acts as a safety factor whereby the upper high heating element 52 cannot be inadvertently activated and also allows the reheating of brewed coffee in the lower portion of the container 12, by the lower low heating element 34.

Preferably, different colored lights (not shown) are connected in parallel with the resistors 118 and 120, respectively, and are suitably positioned on the outside of the container 12 to provide a visual indication of which heating element is activated during use of the beverage maker.

When the beverage maker 10 is being employed for brewing coffee, the assembly 46 is withdrawn from the container 12 by gripping the flange 84 of the valve housing 82. The basket 70 is removed from the ring 64, filled with ground coffee, and re-assembled to the ring. The assembly 46 is then reinserted into the container 12 in the position shown in FIGURE 1, whereupon the assembly separates the upper and lower compartments. The valve element 86 closes the port 62. The upper compartment is then filled with water and the plug 111 connected to an electrical outlet and the switch 117 turned to a "brew" position. At this time, the thermostatic switch 116 is in the full line position illustrated in FIGURE 8, whereupon heat is delivered by means of the coil 54 to the upper compartment until the water therein reaches about 195° F. At this temperature, the valve element 86 unseats from the seat 60 in the manner described previously, thus permitting hot water to pass through port 62 into the basket 70, seep through the ground coffee 72, and drop into the lower compartment 44. The thermostatic switch 116 senses the hot coffee in the compartment 44 and automatically shifts to the position shown in phantom lines in FIGURE 8, whereupon the upper heating element 52 is deactivated and the lower heating element 34 activated. The lower heating element is designed to provide less heat than the upper heating element, namely, to provide sufficient heat to maintain the coffee in the beverage compartment 44 at the proper drinking temperature.

After the upper heating element 52 is deactivated and all the hot water passes to the lower compartment, the temperature in the upper compartment will decrease. As a result, the bimetallic element 88 will return to its original position shown in FIGURE 1, wherein the valve element 86 closes the port 62.

Another form of a thermo-responsive valve assembly is illustrated in FIGURES 4 to 7, such assembly being employed in a coffee maker identical to that illustrated in FIGURES 1 to 3 and 8, and like numbers primed are used to indicate like or corresponding parts.

In this embodiment, the valve element 86' has an upper cylindrical extension 130 which is slidably engaged in a vertical bore 132 in an arm 134 extending horizontally from an upright stand 136. The valve element 86' and the extension 130 are sufficiently light in weight so as to be buoyant in water, thus being capable of floating upwardly when submerged in water.

Means, generally designated 138, are provided for controlling the position of the valve element 86'. Such means includes a cylindrical boss 140 which extends horizontally outwardly from the upper portion of the stand 136. A circular rod 142 extends outwardly from the end 144 of the boss. A vertical slot 146 extends completely through the rod 142 and partly into the boss 140. A bimetallic element 148 in the form of a coil spring is mounted on the boss 140, with its inner end 150 fixedly positioned in the slot 146. The spring 148 has an outwardly extending finger 152 at its outer end. A circular cam disk 154 is rotatably mounted on the rod 142 and is retained thereon by means of a retainer disk 156 which frictionally engages the surface of the rod. A pair of spaced pins 158 extends from the surface 159 of the cam disk 154 rearwardly in such a manner as to lie on opposite sides of the finger 152 on the bimetallic spring element 148. The cam disk 154 is formed with a notch 160 which opens at the outer periphery 162 of the disk.

Figure 4:
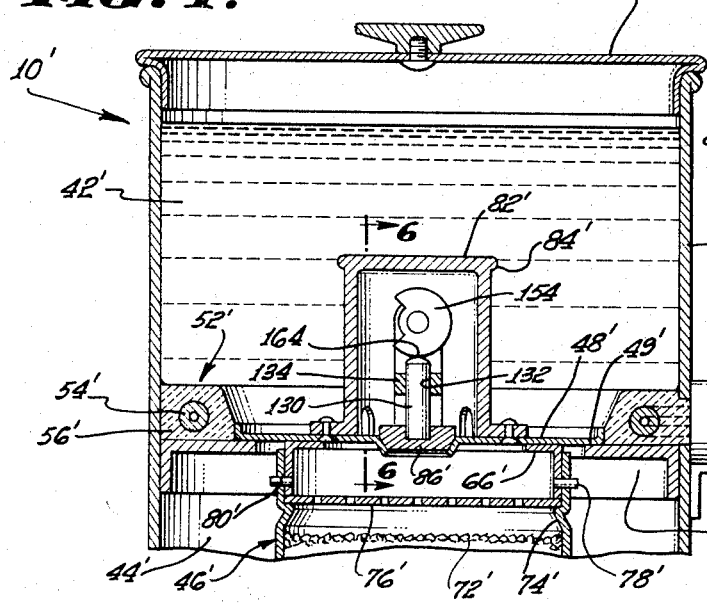
FIGURE 4 is a fragmentary vertical section taken through the upper portion of the coffee maker of the present invention in which a second form of a valve assembly is employed, the valve element of the assembly being shown in its closed position.
Figure 5:
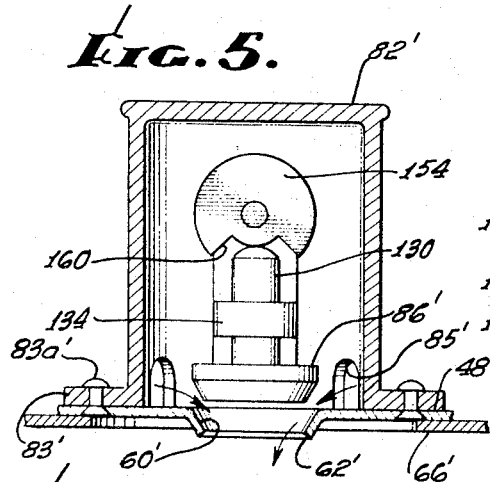
FIGURE 5 is an enlarged sectional view of the valve assembly in FIGURE 4, showing the valve element in its open position.
Figure 7:
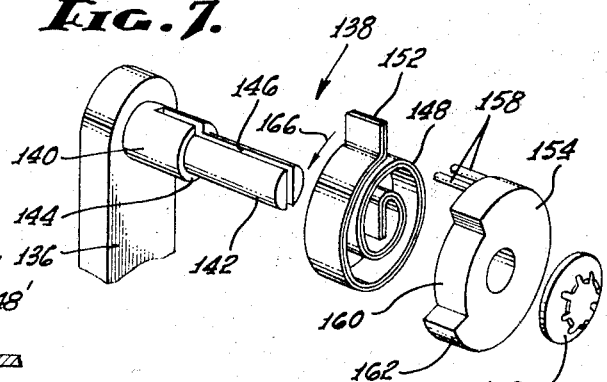
FIGURE 7 is an exploded view of the components employed in the valve assembly illustrated in FIGURE 4.
Figure 6:
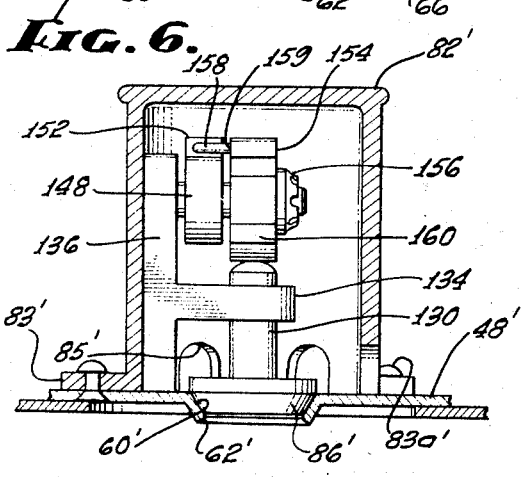
FIGURE 6 is an enlarged vertical section taken along line 6—6 of FIGURE 4.

In this embodiment of the invention, when the temperature of the water within the upper compartment 42' is near room temperature, the cam disk 154 is in the position illustrated in FIGURE 4, wherein the outer periphery 162 of the disk engages the upper end 164 of the extension 130 of the valve element, thereby retaining the latter in its seated position to prevent flow of water from the upper compartment 42' into the lower compartment 44.' When the temperature of the water in the upper compartment reaches preferably about 195°, the bimetallic spring element 148 expands. Since the inner end 150 of the element is fixed in the slot 146, the outer end rotates in the direction indicated by the arrow 166 in FIGURE 7, thus shifting the finger 152 in the same direction. Due to the connection of the cam disk 154 through the pins 158 to the finger, the cam disk 154 rotates in a counterclockwise direction as viewed in FIGURE 4, until the notch 160 is disposed above the extension 130 of the valve element, as seen in FIGURE 5, whereupon the valve element is free to float upwardly and thereby unseat from the valve seat 60'. After the water in the upper compartment 42 flows through the port 62' into the lower compartment, the valve element 86' will drop by gravity upon the valve seat 60' to close the port 62'. The cam disk 154 will return to its original position, as illustrated in FIGURE 4, due to the contraction of the bimetallic coil spring element 148 in response to the decrease in temperature in the upper compartment 42'.

Figure 9:
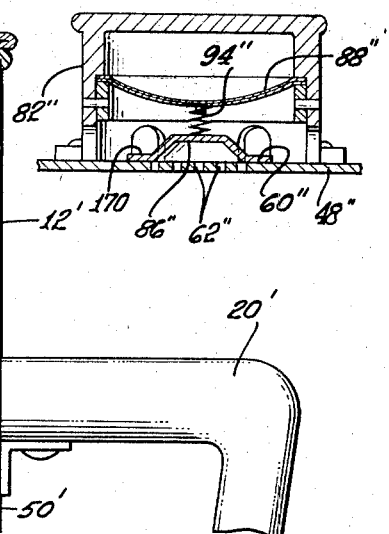
FIGURE 9 is a vertical section taken through the center of a third form of a valve assembly which may be employed in the coffee maker of the present invention, the vlave element of the assembly being shown in its closed position.

A third form of a valve assembly is illustrated in FIGURE 9, such assembly being similar to that illustrated in FIGURES 1 to 3, and like numbers double primed are used to indicate like or corresponding parts.

In this embodiment, the bimetallic disk 88" is mounted in the housing 82" in the same manner as described previously in connection with bimetallic element 88. The valve element 86" is in the form of a circular metallic cap having an annular flat rim 170 which bears against the valve seat 60", such seat being defined by an annular upwardly facing surface on the flat plate 48". A plurality of valve ports 62" are located within the annular valve seat 60" so that when the valve element 86" is in the position shown in FIGURE 9, flow of water through the ports 62" is prevented. A coil spring 94" connects the bimetallic disk 88" to the valve element 86". This valve assembly functions in the same manner as the assembly illustrated in FIGURES 1 to 3, and has the advantage that valve element 86" can lift off the valve seat 60" more easily since only flat annular surfaces of the valve element and seat are in contact when the valve assembly is closed. In addition, this valve assembly is less expensive to manufacture since the ports 62" may be easily punched out of the flat plate 48" and the valve element 88" may be easily formed by a single stamping operation.

What is claimed is:
1. A drip beverage maker comprising:
   a container having an upper water compartment and a lower beverage compartment;
   means for heating water in said water compartment;
   means providing an upwardly facing supporting surface between said compartments;
   a unitary assembly removably positioned in said container and separating said compartments;
   said assembly including a plate supported by said supporting surface, a perforated basket and valve means;
   said basket depending downwardly from said plate into said beverage compartment and adapted to hold an infusion material; and
   said valve means providing flow communication between said compartment when the temperature of water in said water compartment reaches a predetermined value.

2. A beverage maker as set forth in claim 1, wherein said valve means includes a hand gripping portion for facilitating removal of said assembly from said container.

3. A beverage maker as set forth in claim 1, including:
   second heating means for heating beverage in said beverage compartment;
   means responsive to increased temperature in said beverage compartment for deactivating said first mentioned heating means and simultaneously activating said second heating means.

4. A beverage maker as set forth in claim 1, wherein said container is a generally upright cylinder;
   said supporting surface being provided by an annular flange extending inwardly from the inner surface of said cylinder; and
   said plate having a generally circular periphery supported by said flange.

5. A beverage maker as set forth in claim 4, wherein said heating means has an annular configuration and is supported by said flange.

6. A beverage maker as set forth in claim 5, wherein the periphery of said plate engages the inner periphery of said annular heating means in sealing relationship therewith.

7. A beverage maker as set forth in claim 1, wherein said valve means includes a valve seat on said plate and a port within said seat opening into said basket;
   said valve means also including a valve element and a bimetallic element;
   said valve element being normally positioned on said valve seat to close said port; and
   said bimetallic element being disposed in said water compartment and operatively associated with said valve element for withdrawing the latter from said valve seat when the water in said water compartment reaches said predetermined value.

8. A beverage maker as set forth in claim 7, wherein said container is a generally upright cylinder;
   said supporting surface being provided by an annular flange extending inwardly from the inner surface of said cylinder;
   said plate having a generally circular periphery supported by said flange;
   said heating means having an annular configuration and being supported by said flange;
   the periphery of said plate engaging the inner periphery of said annular heating means in sealing relationship therewith;
   said valve means extending upwardly from said plate, providing a handle for facilitating removal of said assembly from said container;
   second means for heating beverage in said beverage compartment; and
   temperature responsive means for deactivating said first mentioned heating means and simultaneously activating said second heating means.

9. In a beverage maker, a plate separating an upper water compartment from a lower beverage compartment, a valve assembly on said plate for controlling the flow of water from said water compartment downwardly through a perforated basket in said beverage compartment, said valve assembly comprising:
   an upwardly facing valve seat on said plate and a port within said seat opening into said basket;
   a floatable valve element above said plate adapted to be positioned on said seat to close said port;
   cam means above said valve element being movable between first and second positions, said cam means in said first position serving to position said valve element on said seat to close said port and, in said second position, allowing said valve element to float upwardly to open said port; and
   temperature responsive means in said upper compartment for shifting said cam means between said first and second position.

10. A beverage maker as set forth in claim 9, wherein said cam means is a rotatably mounted circular disk having a notch therein opening at its outer periphery, the outer periphery of said cam disk engaging an upper surface of said valve element when said cam means is in said first position, and said notch being above said upper surface when said cam means is in said second position whereby said valve element is free to float upwardly.

11. A beverage maker as set forth in claim 10, wherein said temperature responsive means comprises a bimetallic coil spring having one end fixed and the other end connected to said circular cam disk for rotating the same in response to temperature variations.

12. In a beverage maker, a plate separating an upper water compartment from a lower beverage compartment, a valve assembly on said plate for controlling the flow of water from said water compartment downwardly through a perforated basket in said beverage compartment, said valve assembly comprising:
   an upwardly facing valve seat on said plate and a port within said seat opening into said basket;

a valve element normally positioned on said valve seat to close said port;

a bimetallic member movable from a first position relatively close to said valve element to a second position remote from said valve element when the temperature of said member reaches a predetermined value;

spring means connecting said bimetallic member to said valve element; and said spring means becoming increasingly tensioned when said bimetallic member moves from said first position toward said second position, and cooperating with said bimetallic member to unseat said valve element when said predetermined temperature value is reached.

References Cited

UNITED STATES PATENTS

| | | | |
|---|---|---|---|
| 1,806,144 | 5/1931 | Brucker | 99—306 |
| 2,856,843 | 10/1958 | Miklas | 99—306 X |
| 3,333,527 | 8/1967 | Bender | 99—306 X |

ROBERT W. JENKINS, *Primary Examiner.*

U.S. Cl. X.R.

99—306